(12) United States Patent
Durand et al.

(10) Patent No.: US 6,559,206 B1
(45) Date of Patent: May 6, 2003

(54) BITUMEN AND FILLED RESIN EMULSION FOR ROAD SURFACING EMULSION

(75) Inventors: Graziella Durand, Chevreuse (FR); Eric Godard, Elancourt (FR); Jean-François Gal, Montigny le Bretonneux (FR)

(73) Assignee: Colas, Boulogne Billancourt (FR)

( * ) Notice: Subject to any disclaimer, the term of this patent is extended or adjusted under 35 U.S.C. 154(b) by 0 days.

(21) Appl. No.: 09/786,397

(22) PCT Filed: Jul. 5, 2000

(86) PCT No.: PCT/FR00/01934

§ 371 (c)(1),
(2), (4) Date: Aug. 6, 2001

(87) PCT Pub. No.: WO01/02491

PCT Pub. Date: Jan. 11, 2001

(30) Foreign Application Priority Data

Jul. 5, 1999 (FR) .............................. 99 08658

(51) Int. Cl.$^7$ .............................. C08K 3/36; C08L 63/02
(52) U.S. Cl. ................... 523/443; 106/277; 106/278; 523/401; 523/404; 523/417; 523/418; 524/705; 524/800
(58) Field of Search .................... 523/401, 404, 523/417, 418, 443; 524/705, 800; 106/277, 278

(56) References Cited

U.S. PATENT DOCUMENTS 3,324,041 A    6/1967  Sommer et al.

FOREIGN PATENT DOCUMENTS

| EP | 0231477 | | 8/1987 |
| EP | 0695788 | | 2/1996 |
| FR | 2366342 | | 4/1978 |
| FR | 2785604 | * | 5/2000 |
| WO | 96/37660 | | 11/1996 |

* cited by examiner

*Primary Examiner*—Robert Dawson
*Assistant Examiner*—D. Aylward
(74) *Attorney, Agent, or Firm*—Greenblum & Bernstein, P.L.C.

(57) ABSTRACT

The invention consists of a bitumen/resin composite emulsion for a road surface protection layer against the attacks of petroleum derivates, realised by mixing a first emulsion comprising at least one resin with a second emulsion comprising a bituminous binder and a resin crosslinking agent. A pigmentary preparation and/or a load made of a filler or sand or a fine sand or their combinations, can be incorporated to the first emulsion, the second emulsion or into the composite emulsion resulting from the mixture of both emulsions. The loaded composite emulsion enables the realisation of thin film-type surface coatings made of one or several layers.

16 Claims, 1 Drawing Sheet

BITUMEN AND FILLED RESIN EMULSION FOR ROAD SURFACING EMULSION

BACKGROUND OF THE INVENTION

1. Field of the Invention

The present invention relates to a loaded composite emulsion based on a bituminous binder and one or more resins in order to provide a road surface protection layer against petroleum derivatives. The present invention is useful in civil engineering and in the military field.

2. Discussion of Background Information

Materials soluble in organic solvents have been used in the manufacture of road surface layers, thus rendering the coating thus formed poorly resistant to kerosene, to organic oils and to carbohydrates in general. Still, the road surface layers are liable to receive such substances that may be damaging for them. It is therefore desirable to use materials whose resulting coatings have excellent chemical resistance to organic oils, to kerosene and to carbohydrates in general, especially for coatings used for roads, industrial floors, parking areas, petrol station garages, airport runways, and the like.

Most prior art emulsions, formulated to have chemical resistance, contain a large proportion of tars or other products derived from coal and are recognized as being toxic. Toxic products, in the context of the present invention, refer to products that, because of the carcinogenic substances that they contain, must be subject to classification and labelling according to the regulation currently in use in France.

To this day, the products based on bitumen and resin contain a third component, which is a solvent whose vaporization after hot application is detrimental to the environment.

EP 0 231 477 describes an epoxy resin mixed with a bitumen emulsion and a crosslinking agent to improve its permeability to water steam and its metal adhesion. But it is a compound intended to modify the characteristics of the resin, that is in the form of a paste which has not been emulsified and is therefore difficult to handle.

French Patent No. 2,366,342 suggests a compound with the same restraints.

EP 0 695 788, which belongs to the applicant, teaches a composite emulsion that confers the formed coating with excellent chemical resistance to organic oils, to kerosene and to carbohydrates in general, without any toxicity during manufacture, during application, or during the duration of its service. Also, the coating is free from solvent and any other substance liable to be harmful to the environment. This composite emulsion can be cold applied onto a road surface in progress. This composite emulsion for road carpet or running surface is, obtained from a first emulsion comprising a bituminous binder and a crosslinking agent and from a second emulsion comprising a resin. The bituminous binder and the resin are each used in the form of a water emulsion.

However, the behavior of such a composite emulsion with the course of time and/or when it is subject to environmental cycles, such as temperature, humidity variation, etc., and to traffic, is not optimal. The coating layer peels away from the support and cracks in several locations. These defects bring forth degradation of the support such that it becomes then exposed to the environment directly. Moreover, the residual black color of the composite emulsion applied as a thin film evolves with the course of time, notably further to the attack of solar ultraviolet beams due to the presence of epoxy resin, i.e., the film becomes lighter in color, yellowish, fades, and sometimes translucent. The time-related evolution of the emulsion may cause problems in certain situations.

SUMMARY OF THE INVENTION

The present invention suggests remedying these shortcomings by using a bitumen/resin composite emulsion for a road surface protection layer resistant against the attacks of petroleum derivatives, a layer made by mixing a first emulsion comprising at least one resin with a second emulsion comprising a bituminous binder and a resin crosslinking agent. This type of protection is also called A.K.

The present invention relates to a bitumen/resin composite emulsion for a road surface layer to protect the layer against attacks from petroleum derivatives, wherein the composite emulsion is produced by mixing a first emulsion comprising at least one resin with a second emulsion comprising bituminous binder and resin crosslinking agent to form the bitumen/resin composite emulsion. The bitumen/resin composite emulsion further comprises a filling agent selected from filler, sand, fine sand, or mixtures thereof, wherein the filling agent is defined by standard XP P 18-540.

The filling agent can range from 10 to 90% by weight of the total weight of the bitumen/resin composite emulsion. The filling agent can preferably range from 25 to 50% by weight of the bitumen/resin composite emulsion. The filling agent can be siliceous.

The bitumen/resin emulsion can further comprise a pigmentary preparation. The ratio of the pigmentary preparation can range from 0.05 to 2% by weight, the percentage weight being calculated with respect to the weight of bitumen/resin composite emulsion and the weight of the filling agent.

The filling agent can be incorporated into the second emulsion that contains the bituminous binder. The filling agent can be incorporated into the first emulsion that contains the at least one resin. The filling agent can be incorporated into the bitumen/resin composite emulsion.

The at least one resin can comprise an epoxy type resin. The epoxy type resin can be selected from liquid epoxy resins or emulsified solid epoxy resins. The resin crosslinking agent can be injected at the ratio of 1.7 to 1.1 stoichiometrically with respect to the bitiminous binder.

The at least one resin in the resin-containing emulsion can be up to 80% by weight of the resin-containing emulsion. Alternatively, the at least one resin in the resin-containing emulsion can be from 50 to 80% by weight of the resin-containing emulsion.

The present invention also relates to a road having a surface coating comprising one or more layers of the bitumen/resin emulsion as set forth above, wherein each of the one or more layers has a thickness ranging from 0.1 to 2 mm.

The present invention also relates to a bitumen/resin composite emulsion for a road surface layer to protect the layer against attacks by petroleum derivatives, the bitumen/resin emulsion being produced by mixing a first emulsion comprising at least one resin with a second emulsion comprising bituminous binder and resin crosslinking agent to form the bitumen/resin composite emulsion. The bitumen/resin composite emulsion further comprises a filling agent and pigmentary preparation, wherein the filling agent can be selected from filler, sand, fine sand, or mixtures thereof. The filling agent is defined by standard XP P 18-540, wherein the filling agent can range from 25 to 50% by weight of the bitumen/resin composite emulsion. The filling agent can-be siliceous.

The ratio of the pigmentary preparation can range from 0.05 to 2% by weight, the percentage weight being calculated with respect to the weight of bitumen/resin composite emulsion and the weight of the filling agent. The resin in the resin-containing emulsion can be from 50 to 80% by weight of the resin-containing emulsion, and can comprise an epoxy type resin selected from liquid epoxy resins or emulsified solid epoxy resins.

DETAILED DESCRIPTION OF THE PRESENT INVENTION

Figure 1:
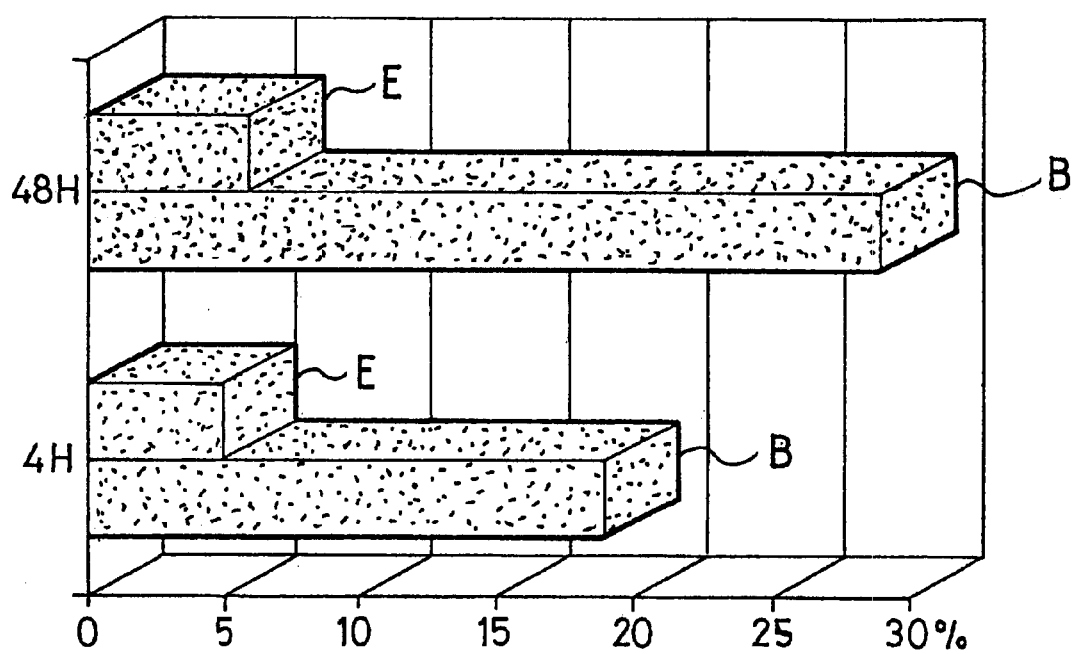
FIG. 1 represents the results of a comparative test between an emulsion of the present invention and coal pitch.

According to the present invention, the composite emulsion also comprises a filling agent, the filling agent comprising individually or in combination at least one of the following elements defined by the standard XP P 18-540 ("norme XP P 18-1540")selected from filler, sand, or fine sand.

The word combination refers to all possible mixtures of the three filling agents.

According to the standard XP P 18-540, the following families can be defined: For O/D fillers: D<2 mm with at least 70% passing through 0.063 mm; For O/D fine sands: $D \leq 1$ mm with at least 70% passing through 0.063 mm; and For O/D sand: $1 < D \leq 6.3$ mm, where D is the greatest dimension of the product.

In various embodiments of the present invention, the following features can be used, individually or according to all their technically possible combinations.

The filling material can be mineral.

The filling material can be siliceous.

The filling material can range between 10 and 90% by weight in the loaded or filled composite emulsion.

The filling material can range preferably between 25 and 50% by weight in the loaded composite emulsion.

The filling material can be optimized at 35%, + or −5%, by weight in the loaded composite emulsion.

The filling material can be incorporated into the emulsion containing the bituminous binder.

The filling material can be incorporated into the resin-containing emulsion.

The filling material can be incorporated into the composite emulsion.

The loaded composite emulsion can comprise further a pigmentary preparation.

The pigmentary preparation can be a liquid-colored, solid or pasty product or preferably dark in color.

The ratio of the pigmentary preparation can range from 0.05 to 2% by weight, whereas the percentage is calculated with respect to the loaded composite emulsion on top of the weight of the filling material.

The color product can be incorporated into the emulsion that contains the bituminous binder.

The color product can be incorporated into the emulsion that contains the resin.

The color product can be incorporated into the filling material.

The color product can be incorporated into the composite emulsion.

The resin can be an epoxy type.

The resin can be selected from liquid epoxy resins or emulsified solid epoxy resins.

One or more resins with known theological properties can be used in the resin-containing emulsion in order to adjust the rheological behavior of the loaded composite emulsion.

One or more liquid resins can be associated with one or more solid resins in the resin-containing emulsion.

One or more emulsified solid epoxy resins can be used in the resin-containing emulsion.

The crosslinking agent can be in excess stoichiometrically in the emulsion that contains the bituminous binder.

The crosslinking agent can be injected at the ratio of 1.7 to 1.1 stoichiometrically. When manufacturing the loaded composite emulsion, the crosslink is fully complete in relation to the case when the crosslinking agent is added stoichiometrically. Indeed, a portion of the crosslinking agent is made inactive to perform crosslinking since the portion is trapped by the other components of the loaded composite emulsion.

The resin percentage in the resin-containing emulsion can reach 80% by weight.

The resin percentage in the resin-containing emulsion ranges preferably from 50 to 80% by weight.

The loaded composite emulsion can be used for the manufacture of a thin film-type surface coating made of one or several layers.

In the case of several layers, each new layer can only be applied after drying and polymerization of the previous layer.

The thickness of a layer can range from 0.1 to 2 mm.

The thickness of a layer can range preferably from 0.5 to 1.2 mm.

The loaded composite emulsion can be used at the ratio of 500 $g/m^2$ to 1 $kg/m^2$.

Several fillers can be used.

Several fine sands can be used.

Several sands can be used.

A bituminous binder refers to a binder that either consists of bitumen only or has been modified by the addition of a polymer or has been fluidized by an oil. This term is kept when a crosslinking agent has been incorporated into this product.

Resin means any chemical entity that, by reaction with an appropriate crosslinking agent, leads to the production of a three-dimensional molecular grid. This is a two-component system. They have been chosen so that this system is active at room temperature. Obviously, the nature of the crosslinking agent depends on the nature of the resin used. These resins can be of the epoxy type.

The epoxy-type resins can be liquid or solid resins. Advantageously, they are linear epoxy resins. They are made conventionally by polycondensation in alkaline medium with a bisphenol A or F derivative and with epichlorohydrin. This derivative is preferably bisphenol A diglicydylether. More flexible epoxy resins can be obtained from polyglycolated derivatives. Within the framework of the present invention, a mixture of two or more different epoxy resins can also be used. These resins with an epoxide functionality react with a chemical component that is a crosslinking agent with amine functionalities. The reaction takes place at room temperature (10° C.>t°>60° C.).

The stoichiometry for the crosslinking reaction with epoxy resin and the crosslinking agent, corresponds to the juxtaposition of an epoxy function of the resin with an active hydrogen of the crosslinking agent.

The loaded composite emulsion has a better behavior to environmental cycles, since it has a reduced thermal expansion coefficient. The loaded composite emulsion exhibits mechanical resistance to improved traffic. It has a lower production and implementation cost. It is easier to handle since the polymerisation time has been lengthened, which improves the workability period. Finally, it is easy to employ, since the end-user only needs to mix two products, possibly three products, in case when the filling agent is not added to one of both emulsions beforehand. In the latter case, both emulsions are sufficiently fluid to be pumped separately.

The present invention will be understood better with the detailed description of an embodiment of a loaded composite emulsion, where FIG. 1 represents the results of a comparative test.

A thin film of protection is placed on a bituminous-coated material or any other support to be protected against chemical attacks. The products necessary to make a thin film are in the form of a three-component kit, which are both emulsions and the load. The loaded composite emulsion is made by mixing a first emulsion that contains the bituminous binder and the crosslinking agent with a second emulsion that contains resin and the filling agent. After single-layer application of the loaded composite emulsion and chemical reaction (crosslinking), the protective coating provided is 0.1 to 2 mm in thickness. The purpose of the protective coating is to avoid any contact between an aggressive agent and the underlying coating.

A comparative test has been carried out in order to compare the resistance of a loaded composite emulsion according to the present invention and a coal pitch emulsion for A.K protection. A first set of duralumin ® plates was covered with the emulsion of the present invention and a second set with the coal pitch. The plates were left for 4 and 48 hours in kerosene and the mass loss was measured. The following graph gives the value of the mass loss in %. It may be noted that the emulsion according to the present invention exhibits far better resistance. On FIG. 1, the curve E corresponds to the emulsion of the present invention and the curve B to the coal pitch.

This embodiment and usage example is given for illustrative and non-limiting purposes of the present invention. The presentation of both these emulsions and of the load can vary in relation to the volume and to the final destination of the loaded composite emulsion thus used. In particular in the case of a preparation kit, the number of components is not fixed and not limited to 3 as in one of the examples. Thus, a two-component kit can be considered, whereas the load is included in one, possibly both emulsions, beforehand. Besides, several fillers and/or fine sands and/or sands of different origins, for example organic and/or mineral, deposits from wind or erosion, siliceous and/or carbonated, can be combined in relation to the particular availabilities and/or advantages.

What is claimed is:

1. A bitumen/resin composite emulsion for a road surface layer to protect the layer against attacks from petroleum derivatives, wherein the composite emulsion is produced by mixing a first emulsion comprising at least one resin with a second emulsion comprising bituminous binder and resin crosslinking agent to form the bitumen/resin composite emulsion, the bitumen/resin composite emulsion further comprising a filling agent selected from filler, sand, fine sand, or mixtures thereof, wherein the filling agent is defined by standard XP P 18-540.

2. The bitumen/resin composite emulsion according to claim 1, wherein the filling agent ranges from 10 to 90% by weight of the total weight of the bitumen/resin composite emulsion.

3. The bitumen/resin composite emulsion according to claim 2, wherein the filling agent ranges from 25 to 50% by weight of the bitumen/resin composite emulsion.

4. The bitumen/resin composite emulsion according to claim 1, wherein the filling agent is siliceous.

5. The bitumen/resin emulsion according to claim 1, further comprising a pigmentary preparation.

6. The bitumen/resin emulsion according to claim 5, wherein the ratio of the pigmentary preparation ranges from 0.05 to 2% by weight, the percentage weight being calculated with respect to the weight of bitumen/resin composite emulsion and the weight of the filling agent.

7. The bitumen/resin emulsion according to claim 1, wherein the filling agent is incorporated into the second emulsion that contains the bituminous binder.

8. The bitumen/resin emulsion according to claim 1, wherein the filling agent is incorporated into the first emulsion that comprises the at least one resin.

9. The bitumen/resin emulsion according to claim 1, wherein the filling agent is incorporated into the bitumen/resin composite emulsion.

10. The bitumen/resin emulsion according to claim 1, wherein the at least one resin comprises an epoxy type resin.

11. The bitumen/resin emulsion according to claim 10, wherein the epoxy type resin is selected from liquid epoxy resins or emulsified solid epoxy resins.

12. The bitumen/resin emulsion according to claim 1, wherein the resin crosslinking agent is injected at the ratio of 1.7 to 1.1 stoichiometrically with respect to the bituminous binder.

13. The bitumen/resin emulsion according to claim 1, wherein the at least one resin in the resin-containing emulsion is up to 80% by weight of the resin-containing emulsion.

14. The bitumen/resin emulsion according to claim 13, wherein the at least one resin in the resin-containing emulsion is from 50 to 80% by weight of the resin-containing emulsion.

15. A road having a surface coating comprising one or more layers of the bitumen/resin emulsion according to claim 1, wherein each of the one or more layers has a thickness ranging from 0.1 to 2 mm.

16. A bitumen/resin composite emulsion for a road surface layer to protect the layer against attacks by petroleum derivatives, the bitumen/resin emulsion being produced by mixing a first emulsion comprising at least one resin with a second emulsion comprising bituminous binder and resin crosslinking agent to form the bitumen/resin composite emulsion, the bitumen/resin composite emulsion further comprising a filling agent and pigmentary preparation, the filling agent being selected from filler, sand, fine sand, or mixtures thereof, the filling agent being defined by standard XP P 18-540, the filling agent ranging from 25 to 50% by-weight of the bitumen/resin composite emulsion, the filling agent being siliceous, the ratio of the pigmentary preparation ranging from 0.05 to 2% by weight, the percentage weight being calculated with respect to the weight of bitumen/resin composite emulsion and the weight of the filling agent, the at least one resin in the resin-containing emulsion being from 50 to 80% by weight of the resin-containing emulsion, and the at least one resin comprising an epoxy type resin selected from liquid epoxy resins or emulsified solid epoxy resins.

* * * * *